(12) United States Patent
Weis

(10) Patent No.: US 10,549,967 B1
(45) Date of Patent: Feb. 4, 2020

(54) HUNTED GAME WINCHING ASSEMBLY

(71) Applicant: Randoulf Weis, Avella, PA (US)

(72) Inventor: Randoulf Weis, Avella, PA (US)

(*) Notice: Subject to any disclaimer, the term of this patent is extended or adjusted under 35 U.S.C. 154(b) by 0 days.

(21) Appl. No.: 16/419,094

(22) Filed: May 22, 2019

(51) Int. Cl.
*B66D 3/00* (2006.01)
*B66D 1/00* (2006.01)
*A01M 31/00* (2006.01)

(52) U.S. Cl.
CPC .......... *B66D 3/006* (2013.01); *A01M 31/006* (2013.01); *B66D 1/00* (2013.01)

(58) Field of Classification Search
CPC .......... B66D 3/006; B66D 1/00; A01M 31/00; A01M 31/006; B62B 2202/42; B65G 7/12
See application file for complete search history.

(56) References Cited

U.S. PATENT DOCUMENTS

| | | | | |
|---|---|---|---|---|
| 3,116,049 A | * | 12/1963 | Stranahan | A01M 31/006 254/287 |
| 4,023,844 A | * | 5/1977 | Roberts | A01M 31/00 294/26 |
| 4,145,028 A | * | 3/1979 | Kelley | B66D 1/00 224/263 |
| 4,444,375 A | * | 4/1984 | Horn | B66D 1/00 104/173.2 |
| 4,552,340 A | * | 11/1985 | Sheppard | B66D 3/18 254/346 |
| 4,662,551 A | * | 5/1987 | Dudley | A45F 3/08 224/262 |
| 4,828,307 A | * | 5/1989 | Sokol | A01M 31/006 294/153 |
| 5,607,143 A | | 3/1997 | Regal | |
| 5,848,816 A | * | 12/1998 | Hancock | A01M 31/00 294/15 |
| 6,089,636 A | * | 7/2000 | Harris | A01K 1/0236 294/150 |
| 6,129,399 A | * | 10/2000 | Burch, Sr. | A01M 31/00 294/150 |
| 6,250,699 B1 | * | 6/2001 | Robertson | A01M 31/006 294/152 |
| 8,757,638 B2 | * | 6/2014 | Proch | B62B 15/007 224/921 |
| 2005/0104052 A1 | * | 5/2005 | Bilcik | A01M 31/006 254/279 |

(Continued)

FOREIGN PATENT DOCUMENTS

WO  WO2008060593  5/2008

OTHER PUBLICATIONS 2017-34775V, Hong J K, Nov. 2015.*

*Primary Examiner* — Michael E Gallion

(57) ABSTRACT

A hunted game winching assembly for drawing hunted game through uneven area includes a winch has a cable is wrapped therearound when the winch is turned on to rotate in a first direction. The cable is drawn off of the winch when the winch is urged to rotate in a second direction. A harness is releasably coupled to the cable and the harness is positionable around hunted game. In this way the winch can draw the hunted game toward the winch when the winch is turned on the rotate in the first direction. A pair of handles is each of the handles is coupled to and extends in opposite directions from the winch. Each of the handles can be gripped to positioned the winch between a user and the hunted game.

8 Claims, 5 Drawing Sheets

(56) References Cited

U.S. PATENT DOCUMENTS

| | | | | |
|---|---|---|---|---|
| 2008/0283334 A1* | 11/2008 | Fickey | ................ | A01M 31/006 |
| | | | | 182/20 |
| 2009/0233535 A1* | 9/2009 | Boduch | ............... | A01M 31/006 |
| | | | | 452/187 |
| 2013/0270495 A1* | 10/2013 | Pate | .......................... | B66C 1/18 |
| | | | | 254/1 |
| 2015/0090196 A1* | 4/2015 | Fleming | ............... | A01K 27/003 |
| | | | | 119/795 |
| 2017/0325445 A1* | 11/2017 | Mitchell | ............. | A01M 31/006 |
| 2018/0297826 A1* | 10/2018 | Haddix, II | ............... | B66D 3/20 |

\* cited by examiner

HUNTED GAME WINCHING ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to winching devices and more particularly pertains to a new winching device for drawing hunted game through uneven area.

BRIEF SUMMARY OF THE INVENTION

An embodiment of the disclosure meets the needs presented above by generally comprising a winch has a cable is wrapped therearound when the winch is turned on to rotate in a first direction. The cable is drawn off of the winch when the winch is urged to rotate in a second direction. A harness is releasably coupled to the cable and the harness is positionable around hunted game. In this way the winch can draw the hunted game toward the winch when the winch is turned on the rotate in the first direction. A pair of handles is each of the handles is coupled to and extends in opposite directions from the winch. Each of the handles can be gripped to positioned the winch between a user and the hunted game.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
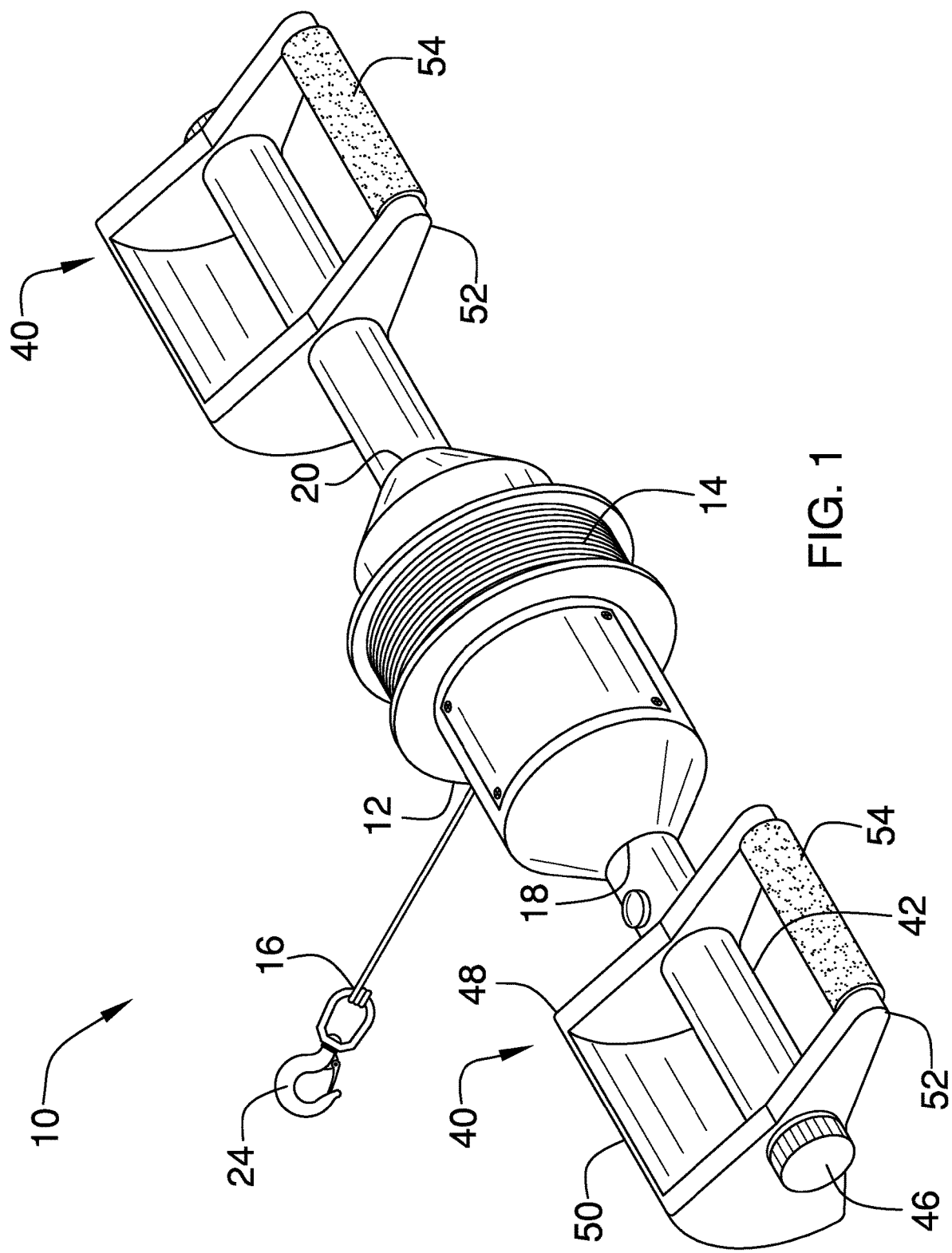
FIG. 1 is a perspective view of a hunted game winching assembly according to an embodiment of the disclosure.
Figure 2:
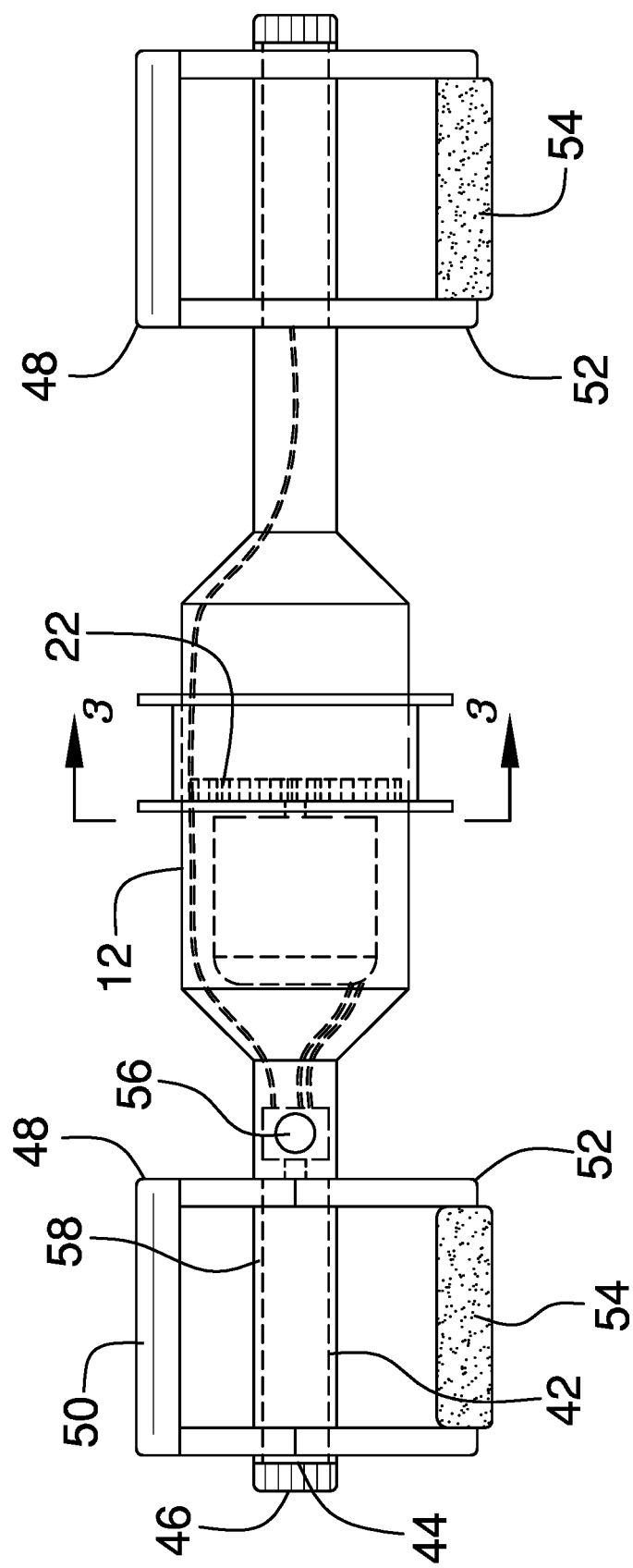
FIG. 2 is a back phantom view of an embodiment of the disclosure.
Figure 3:
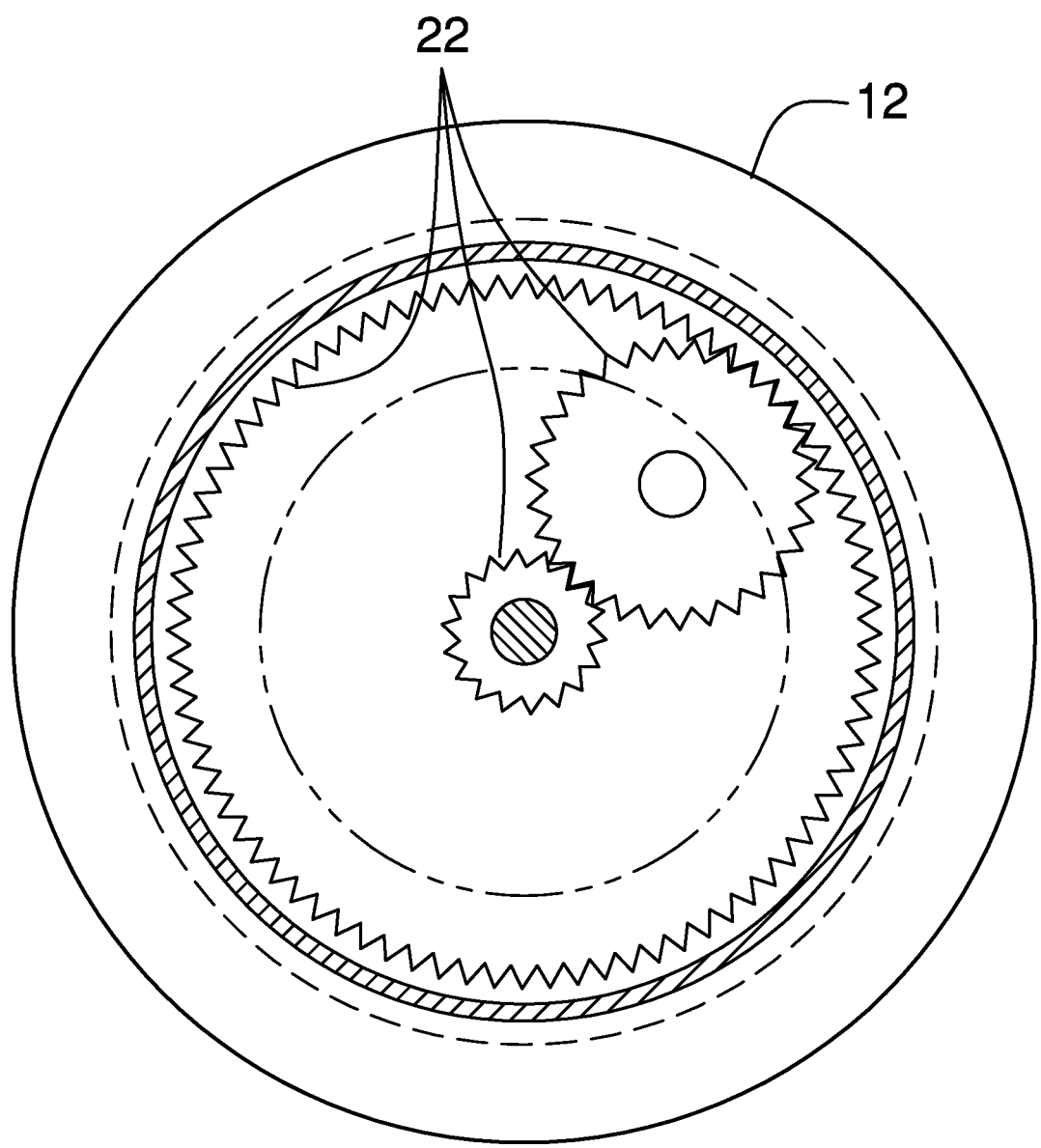
FIG. 3 is a cross sectional view taken along line 3-3 of FIG. 2 of an embodiment of the disclosure.
Figure 4:
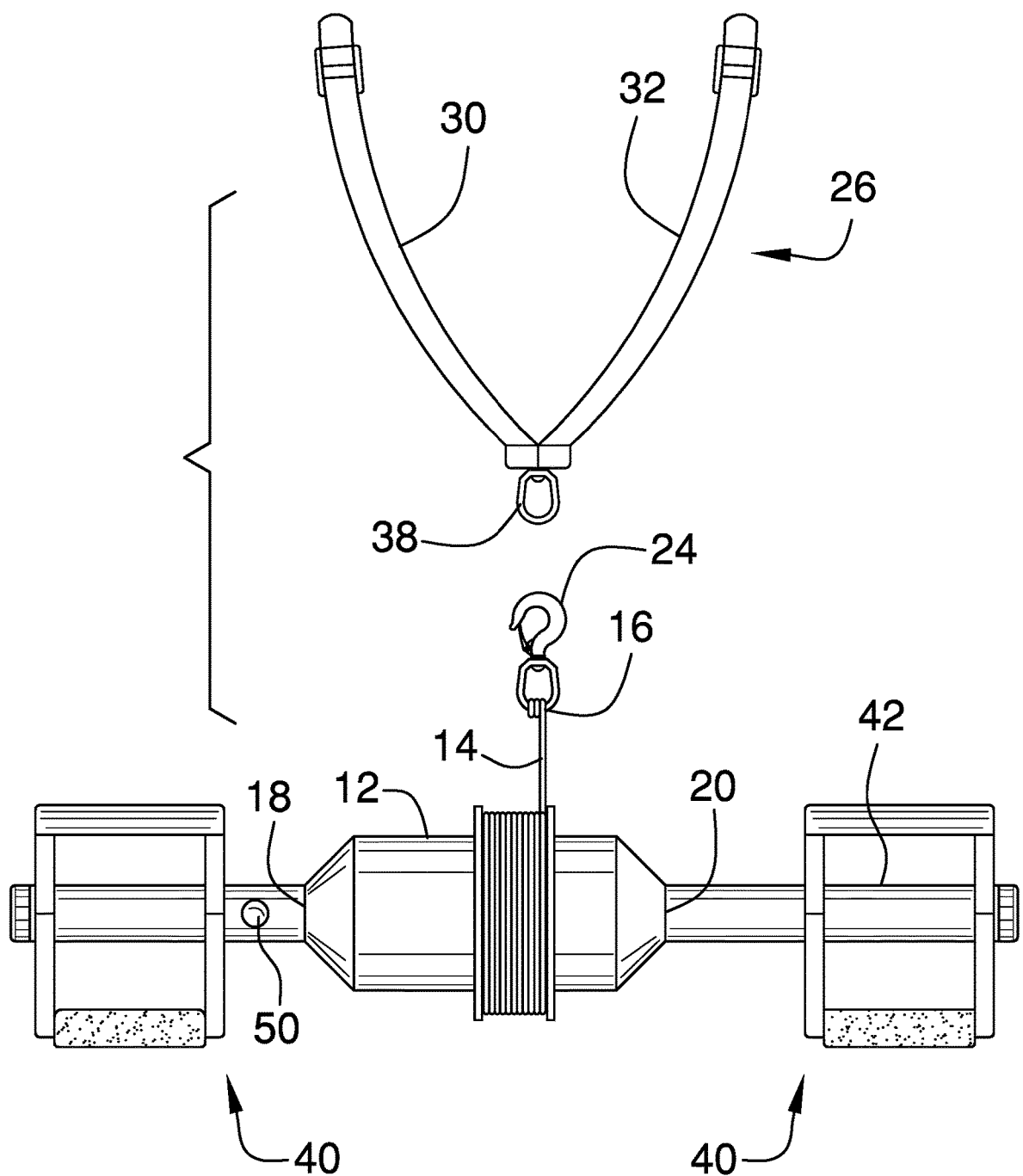
FIG. 4 is a top view of an embodiment of the disclosure.
Figure 5:
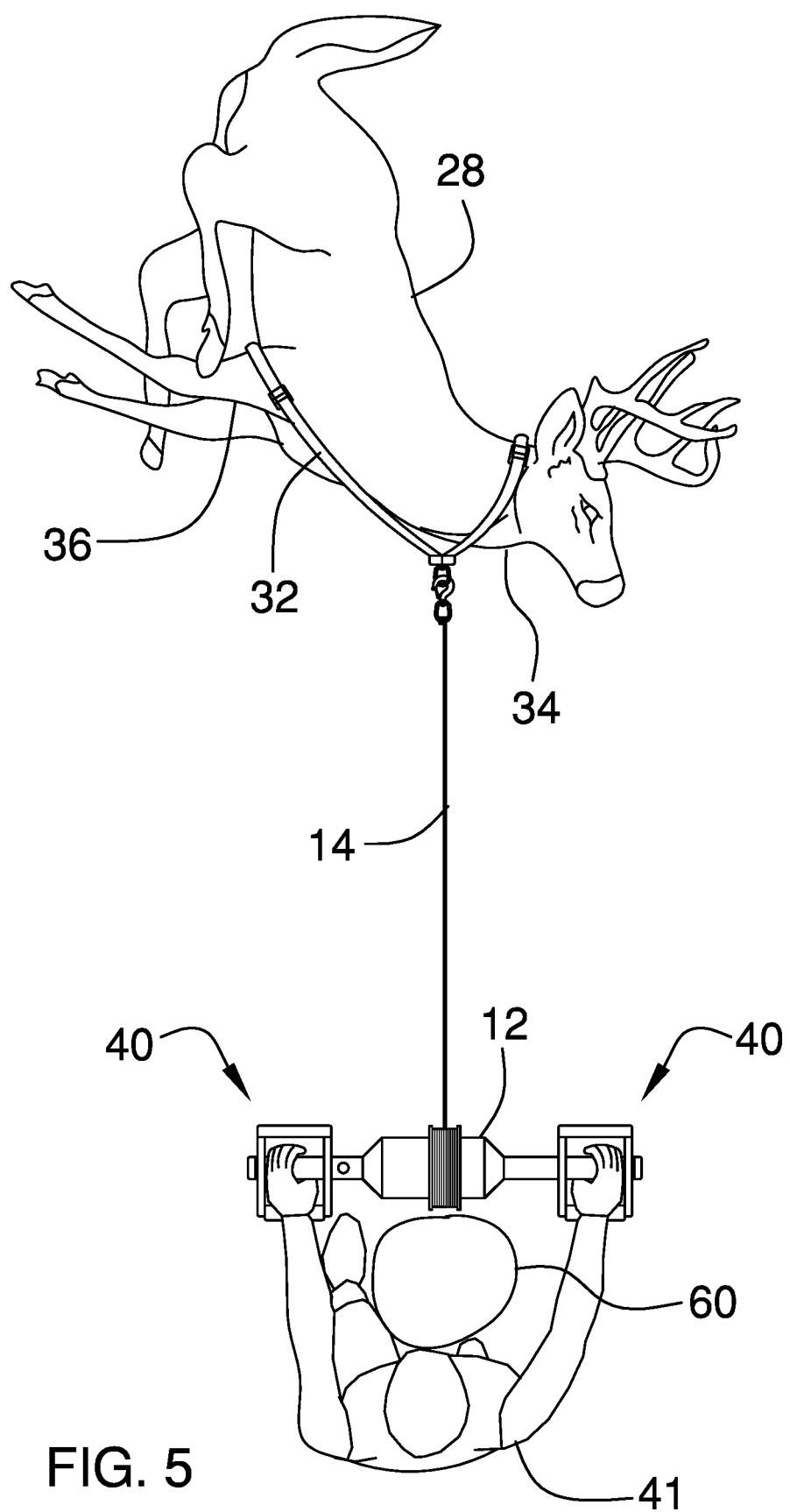
FIG. 5 is a perspective in-use view of an embodiment of the disclosure.

With reference now to the drawings, and in particular to FIGS. 1 through 5 thereof, a new winching device embodying the principles and concepts of an embodiment of the disclosure and generally designated by the reference numeral 10 will be described.

As best illustrated in FIGS. 1 through 5 the hunted game winching assembly 10 generally comprises a winch 12 that has a cable 14 is wrapped therearound when the winch 12 is turned on to rotate in a first direction. The cable 14 is drawn off of the winch 12 when the winch 12 is urged to rotate in a second direction. The cable 14 has a distal end 16 with respect to the winch 12 and the winch 12 has a first lateral side 18 and a second lateral side 20. The winch 12 may be an electric winch or the like, and as is most clearly shown in FIG. 3, the winch 12 may include a series of reduction gears 22. In this way the cable 14 may be wrapped around the winch 12 at a sufficiently slow rate.

A hook 24 is coupled to the distal end 16 of the cable 14 and a harness 26 is releasably coupled to the cable 14. The harness 26 is positionable around hunted game 28, such as a white tail deer or the like, to draw the hunted game 28 toward the winch 12 when the winch 12 is turned on to rotate in the first direction. The harness 26 comprises a first half 30 that is coupled a second half 32. The first half 30 can be wrapped around a neck 34 of the hunted game 28 and the second half 32 can be wrapped around front legs 36 of the hunted game 28. A coupler 38, such as a ring or the like, is coupled to the harness 26 and the coupler 38 is positioned at an intersection between the first 30 and second 32 halves of the harness 26. The hook 24 on the cable 14 engages the coupler 38 for coupling the harness 26 to the cable 14.

A pair of handles 40 is provided and each of the handles 40 is coupled to and extends in opposite directions from the winch 12. In this way each of the handles 40 can be gripped having the winch 12 being positioned between a user 41 and the hunted game 28. Each of the handles 40 is positioned on a respective one of the first 18 and second 20 lateral sides of the winch 12. The cable 14 plays outwardly from a bottom side of the winch 12 when the handles 40 are gripped.

Each of the handles 40 comprises a rod 42 is that coupled to and extends away from a respective one of the first 18 or second 20 lateral sides of the winch 12 thereby faciltiating the rod 42 to be gripped. The rod 42 is hollow, the rod 42 has a distal end 44 with respect to the winch 12 and the distal end 44 of the rod 42 is open. A cap 46 is removably coupled to the distal end 44 of the rod 42 for closing the distal end 44 of the rod 42.

A shield 48 is coupled to the rod 42 and the shield 48 includes a barrier 50 that is spaced forwardly from the rod 42 to protect the user's 41 hands when the user 41 grips the rod 42. The barrier 50 may be a concavely arcuate panel or the like. A pair of stops 52 is each coupled to the rod 42 and each of the stops 52 has a cushion 54 that is spaced rearwardly from the rod 42. The cushion 54 abuts a bottom of the user's 41 arm when the user 41 grips the rod 42 thereby inhibiting the winch 12 from rotating when the winch 12 is turned on. The cushion 54 is comprised of a resiliently compressible material for enhancing comfort for the user 41.

A power button 56 is coupled to a respective one of the handles 40 and the power button 56 is electrically coupled to the winch 12. The power button 56 turns the winch 12 on to rotate in the first direction when the power button 56 is depressed. A power supply 58 is positioned within the rod 42 of a respective one of the handles 40. The power supply 58 is electrically coupled to the power button 56 and the power supply 58 comprises at least one battery.

In use, the harness 26 is positioned around the hunted game 28 when the hunted game 28 has fallen in an area that prevents the user 41 from carrying the hunted game 28 out of the area. The hook 24 on the cable 14 is attached to the coupler 38 on the harness 26 and the cable 14 is drawn outwardly from the winch 12. The user 41 walks sufficiently far away from the hunted game 28, either until the user 41 reaches a clearing or until the user 41 reaches the end of the cable 14. The user 41 stands behind a tree 60 and the user 41 positions the winch 12 in front of the tree 60. The user 41 grips both of the handles 40 and the power button 56 is depressed. Thus, the tree 60 supports the user 41 while the winch 12 draws the hunted game 28 toward the user 41. The process of drawing the hunted game 28 with the winch 12 is repeated until such time that the hunted game 28 can be easily dragged by the user 41.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hunted game winching assembly being configured to drag hunted game over uneven terrain, said assembly comprising:

a winch having a cable being wrapped therearound when said winch is turned on to rotate in a first direction, said cable being drawn off of said winch when said winch is urged to rotate in a second direction, said cable having a distal end with respect to said winch, said winch having a first lateral side and a second lateral side;

a hook being coupled to said distal end of said cable;

a harness being releasably coupled to said cable, said harness being positionable around hunted game wherein said winch is configured to draw the hunted game toward said winch when said winch is turned on the rotate in said first direction; and a pair of handles, each of said handles being coupled to and extending in opposite directions from said winch wherein each of said handles is configured to be gripped having said winch being positioned between a user and the hunted game, each of said handles being positioned on a respective one of said first and second lateral sides of said winch.

2. The assembly according to claim 1, wherein:

said harness comprises a first half being coupled a second half, said first half being configured to be wrapped around a neck of the hunted game, said second half being configured to be wrapped around front legs of the hunted game; and said assembly further comprises a coupler being coupled to said harness, said coupler being positioned at an intersection between said first and second halves of said harness, said hook on said cable engaging said coupler for coupling said harness to said cable.

3. The assembly according to claim 1, wherein:

each of said handles comprises a rod being coupled to and extending away from a respective one of said first or second lateral sides of said winch wherein said rod is configured to be gripped, said rod being hollow, said rod having a distal end with respect to said winch, said distal end being open; and said assembly further comprises a cap being removably coupled to said distal end of said rod for closing said distal end of said rod.

4. The assembly according to claim 3, wherein each of handles comprises a shield being coupled to said rod, said shield having a barrier being spaced forwardly from said rod wherein said barrier is configured to protect the user's hands when the user grips said rod.

5. The assembly according to claim 4, wherein each of said handles comprises a pair of stops, each of said stops being coupled to said rod, each of said stops having a cushion being spaced rearwardly from said rod wherein said cushion is configured to abut a bottom of the user's arm when the user grips said rod thereby inhibiting said winch from rotating when said winch is turned on.

6. The assembly according to claim 3, further comprising a power button being coupled to a respective one of said handles, said power button being electrically coupled to said winch, said power button turning said winch on to rotate in said first direction when said power button is depressed.

7. The assembly according to claim 6, further comprising a power supply being positioned within said rod of a respective one of said handles, said power supply being electrically coupled to said power button, said power supply comprising at least one battery.

8. A hunted game winching assembly being configured to drag hunted game over uneven terrain, said assembly comprising:

a winch having a cable being wrapped therearound when said winch is turned on to rotate in a first direction, said cable being drawn off of said winch when said winch is urged to rotate in a second direction, said cable having a distal end with respect to said winch, said winch having a first lateral side and a second lateral side;

a hook being coupled to said distal end of said cable;

a harness being releasably coupled to said cable, said harness being positionable around hunted game wherein said winch is configured to draw the hunted game toward said winch when said winch is turned on the rotate in said first direction, said harness comprising a first half being coupled a second half, said first half being configured to be wrapped around a neck of the hunted game, said second half being configured to be wrapped around front legs of the hunted game;

a coupler being coupled to said harness, said coupler being positioned at an intersection between said first and second halves of said harness, said hook on said cable engaging said coupler for coupling said harness to said cable; and a pair of handles, each of said handles being coupled to and extending in opposite directions from said winch wherein each of said handles is configured to be gripped having said winch being positioned between a user and the hunted game, each of said handles being positioned on a respective one of said first and second lateral sides of said winch, each of said handles comprising:

a rod being coupled to and extending away from a respective one of said first or second lateral sides of said winch wherein said rod is configured to be gripped, said rod being hollow, said rod having a distal end with respect to said winch, said distal end being open;

a cap being removably coupled to said distal end of said rod for closing said distal end of said rod;

a shield being coupled to said rod, said shield having a barrier being spaced forwardly from said rod wherein said barrier is configured to protect the user's hands when the user grips said rod; and a pair of stops, each of said stops being coupled to said rod, each of said stops having a cushion being spaced rearwardly from said rod wherein said cushion is configured to abut a bottom of the user's arm when the user grips said rod thereby inhibiting said winch from rotating when said winch is turned on;

a power button being coupled to a respective one of said handles, said power button being electrically coupled to said winch, said power button turning said winch on to rotate in said first direction when said power button is depressed; and a power supply being positioned within said rod of a respective one of said handles, said power supply being electrically coupled to said power button, said power supply comprising at least one battery.

\* \* \* \* \*